T. W. SCHLATER.
DRAFT HARNESS.
APPLICATION FILED APR. 8, 1910.
970,119.
Patented Sept. 13, 1910.
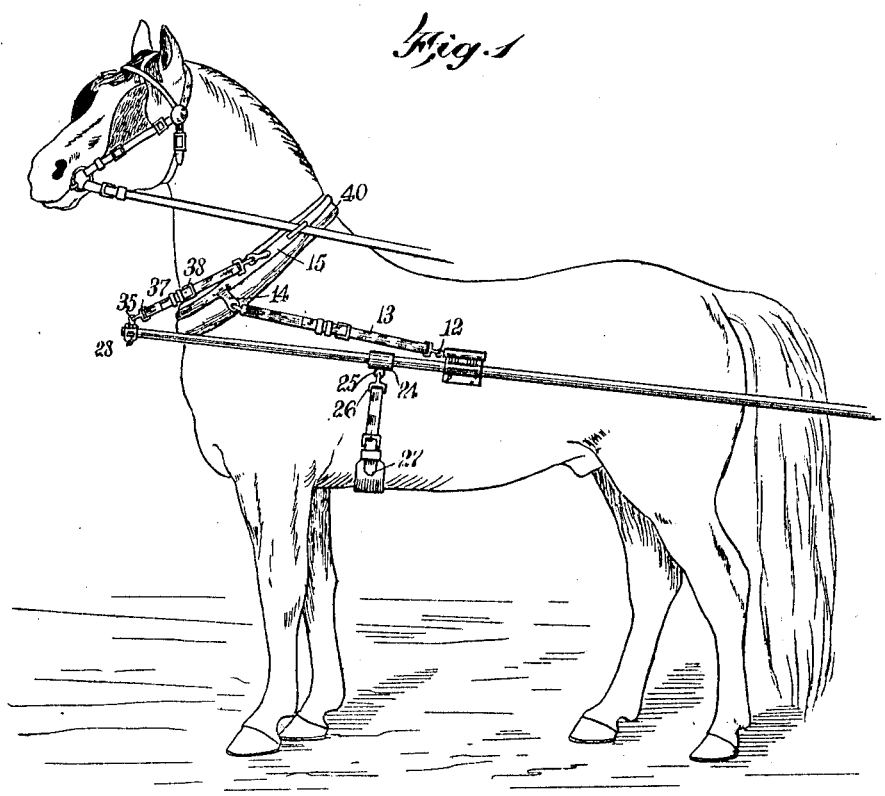
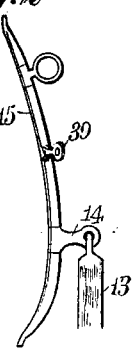
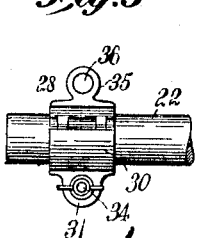
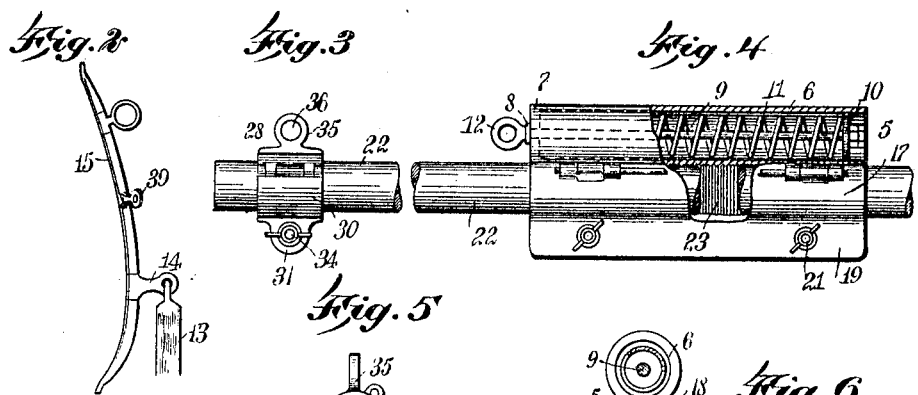
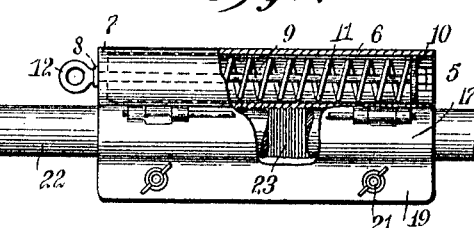
WITNESSES:
INVENTOR
Thomas W. Schlater
BY
ATTORNEYS

UNITED STATES PATENT OFFICE.

THOMAS W. SCHLATER, OF PLAQUEMINE, LOUISIANA.

DRAFT-HARNESS.

970,119.  Specification of Letters Patent.  Patented Sept. 13, 1910.

Application filed April 8, 1910. Serial No. 554,186.

*To all whom it may concern:*

Be it known that I, THOMAS W. SCHLATER, a citizen of the United States, and a resident of Plaquemine, in the parish of Iberville and State of Louisiana, have invented a new and Improved Draft-Harness, of which the following is a full, clear, and exact description.

My invention relates to harness for draft animals, and it has for its object to provide a harness in which there are few parts, it being possible to manufacture the parts at little expense.

Another object of the invention is to provide a harness for draft animals which will permit of the harnessing and unharnessing of the draft animals very quickly.

Still another object of the invention is to secure the tug straps of the harness to the hames and to spring members which are secured to the shafts, the hames being connected with the shafts in front by means of straps.

Still other objects of the invention will appear in the following complete description.

In this specification I will describe the preferred form of my invention, it being understood that the scope of my invention is defined in the appended claim.

Reference is to be had to the accompanying drawings forming a part of this specification, in which similar characters of reference indicate corresponding parts in all the views, and in which—

Figure 1 is a view of a horse hitched up with my improved harness; Fig. 2 is a view of one of the hames used with my harness; Fig. 3 is a fragmentary view showing the free forward terminal of one of the shafts; Fig. 4 is a fragmentary view of the shafts, showing my spring device; Fig. 5 is an end view, showing one of the clamps which are secured to the free terminals of the shafts; and Fig. 6 is a transverse sectional view of my spring device.

By referring to the drawings it will be seen that the spring device 5 has a cylinder 6 and a head 7, there being an orifice 8 in the said head 7. A plunger 9 is disposed through this orifice 8, the plunger 9 having secured to it a head 10, there being a spring 11 disposed between the head 10 on the plunger 9 and the head 7 of the cylindrical member 6. There is an eye 12 at the outer terminal of the plunger 9, to which the tug straps 13 are secured, these tug straps 13 being also secured to the flanges 14 on the hames 15. This spring device has a curved flange 16, which is preferably integral with the cylinder 6, there being another curved flange 17, which is hinged to an extension 18 of the cylinder 6, these curved flanges 16 and 17 having straight terminals 19, there being orifices in these terminals, through which a bolt 20 is disposed, a thumb nut 21 engaging the thread of the said bolt 20 to press the terminals 19 together, so that a shaft 22 may be clamped between the curved flanges 16 and 17. The inner surfaces of these curved flanges 16 and 17 are corrugated, as shown at 23 in Fig. 4 of the drawings.

Two of the spring devices are provided, one being secured to each of the shafts 22. Two sleeves 24 are provided, one being mounted on each of the shafts 22, the sleeves having eyes 25 to which are secured snap hooks 26 which are connected with a bellyband 27. Clamp members 28 are secured to the forward free terminals of the shafts 22, the clamps 28 each having a curved portion 29, and another curved portion 30, which is hinged to the first-mentioned curved portion. These curved portions 29 and 30 have straight terminals 31, with orifices 32 therein, and are held together by means of a bolt 33 and a thumb nut 34. Lugs 35 extend upwardly from the curved portions 29, the lugs 35 having eyes 36, to which are secured snap hooks 37 which are in turn secured to straps 38, these straps 38 being secured to lugs 39, the lugs 39 being secured to the hames 15 above the lugs 14.

It will be understood that a horse may be readily hitched to a vehicle with my harness, since it is only necessary to put the collar 40 on the horse and to adjust the hames thereto, or if these hames 15 are secured to the collar 40, the hames will be disposed in place when the collar has been placed on the horse's neck. The collar 40 being in place, the stableman has only to snap the hooks on the straps 13 into the eyes 12 and snap the hooks 37 on the straps 38 in the eyes 36 in the lugs 35, after which the hooks 26 on the belly-band 27 are snapped in the lugs 25. When this has been done, it is only necessary to adjust the bridle on the horse and then the animal may be driven.

When the horse moves forwardly, the tug straps 13 will cause the plungers 9 to be drawn forwardly for a distance, and the strain will be taken up by the shafts and the vehicle will be drawn forwardly. When the horse is stopped suddenly, or is backed, the straps 38 which are secured to the free terminals of the shafts 22, will exert a backward pressure on the shafts and will move the vehicle backwardly. As the straps 38 are secured to the lugs 39 above the lugs 14, the shafts 22 will be supported by these straps 38.

Having thus described my invention, I claim as new and desire to secure by Letters Patent:

In a harness, a collar having hames, tug straps secured to the hames, spring devices secured to the tug straps and to the shafts, and additional straps secured to the hames, the additional straps being led forwardly and being adapted to be secured to the forward terminals of the shafts, the spring devices on the tugs being adapted, with the tugs, for holding the collar in place on an animal when the animal is being backed and there is a strain on the said additional straps.

In testimony whereof I have signed my name to this specification in the presence of two subscribing witnesses.

THOMAS W. SCHLATER.

Witnesses:
GEO. A. DELACROIX,
D. B. LOZANO.